United States Patent [19]

Mautner et al.

[11] Patent Number: 5,359,022

[45] Date of Patent: Oct. 25, 1994

[54] PROCESS FOR THE PREPARATION OF ORGANOPOLYSILOXANE RESINS

[75] Inventors: Konrad Mautner, Burgkirchen; Richard Weidner, Burghausen; Helmut Oswaldbauer, Stubenberg, all of Fed. Rep. of Germany

[73] Assignee: Wacker Chemie GmbH, Munich, Fed. Rep. of Germany

[21] Appl. No.: 148,102

[22] Filed: Nov. 3, 1993

Related U.S. Application Data

[63] Continuation of Ser. No. 947,581, Sep. 21, 1992, abandoned.

[51] Int. Cl.$^5$ ................................................ C08G 77/08
[52] U.S. Cl. .......................................... 528/23; 528/12
[58] Field of Search ..................................... 528/12, 23

[56] References Cited

U.S. PATENT DOCUMENTS

| | | | |
|---|---|---|---|
| 3,354,095 | 11/1967 | Burzynski et al. | 252/316 |
| 3,624,030 | 11/1971 | Pruvost et al. | 528/12 |
| 4,239,877 | 12/1980 | Roedel | 528/12 |

*Primary Examiner*—Melvyn I. Marquis
*Attorney, Agent, or Firm*—Martin Connaughton

[57] ABSTRACT

A process for preparing an organopolysiloxane resin, which comprises reacting in a first stage at least one silane of the formula $$R_a Si(OR^1)_{4-a} \qquad (I)$$

in which a is 0, 1, 2 or 3, R is a monovalent organic radical, and/or a partial hydrolyzate thereof, with the proviso that at least one silane of formula (I) in which a is equal to 0 or 1, and/or a partial hydrolyzate thereof, is employed, and, if appropriate, an organo(poly) siloxane with water in the presence of acid and, if appropriate, other substances, in a second stage reacting the reaction mixture obtained from the first stage in the presence of base and, if appropriate, other substances, and in a third stage adding with stirring, the reaction mixture obtained in the second stage into water, and if appropriate mixed with additives.

17 Claims, No Drawings

PROCESS FOR THE PREPARATION OF ORGANOPOLYSILOXANE RESINS

This application is a continuation of application Ser. No. 07/947,581, filed Sep. 21, 1992.

The invention related to organopolysiloxane resins and particularly to a process for preparing organopolysiloxane resins. More particularly the process relates to a process for preparing organopolysiloxane resins by the hydrolysis and condensation of silanes, and their use.

BACKGROUND OF THE INVENTION

Processes for preparing organopolysiloxane resins are already known. For example, U.S. Pat. No. 4,605,446 (Kansai Paint Co. Ltd.; published on Aug. 12, 1986) describes a process in which tetraalkoxysilanes and trialkoxysilanes are first hydrolyzed in the presence of acid and then condensed in the presence of base. The organopolysiloxanes formed are isolated by the addition of water-insoluble solvents and phase separation. U.S. Pat. No. 4,528,390 (Toshiba Silicone Co., Ltd.; published on Jul. 9, 1985) discloses a process for preparing organosilicon sesquioxides by the hydrolysis and condensation of methyltrialkoxysilanes in an aqueous solution of ammonia or amine and thereafter the precipitated resin is isolated. Furthermore, German Offenlegungsschrift 3717073 (Wacker-Chemie GmbH; published on Dec. 8, 1988) or corresponding U.S. Pat. No. 4,935,484 (published on Jun. 19, 1990) describes a process for preparing silicone resin powders by spray drying aqueous colloidal suspensions of organopolysiloxanes prepared by a special process.

Therefore, it is an object of the present invention to provide a process for preparing organopolysiloxane resins in an easy manner. A further object of the present invention is to provide a process for preparing organopolysiloxane resin powders in a technically easy manner.

SUMMARY OF THE INVENTION

The foregoing objects and others which will become apparent from the following description are accomplished in accordance with this invention, generally speaking, by providing a process for preparing organopolysiloxane resins in which in a first stage at least one silane of the formula $$R_a Si(OR^1)_{4-a} \qquad (I)$$

in which a is 0, 1, 2 or 3, R is the same or different and is a monovalent organic radical, and $R^1$ is the same or different and is a monovalent organic radical, and/or a partial hydrolyzate thereof, with the proviso that at least one silane of formula (I) in which a is equal to 0 or 1, and/or a partial hydrolyzate thereof, is employed, and, if appropriate, an organo(poly) siloxane selected from the group consisting of $$R^2{}_3Si{-}O{-}SiR^2{}_3 \qquad (II)$$

in which $R^2$ can be the same or different and is the same as R, $$(R^3{}_2SiO)_b \qquad (III)$$

in which $R^3$ can be the same or different and is the same as R, and b is an integer with a value of from 3 to 8, preferably 4 or 5, and mixtures thereof, are reacted with water in the presence of acid and, if appropriate, other substances, in a second stage the reaction mixture obtained in the first stage is reacted in the presence of a base and, if appropriate, other substances, and in a third stage the reaction mixture obtained in the second stage is stirred into water, and if appropriate mixed with additives.

The radical R is preferably a monovalent hydrocarbon radical having from 1 to 18 carbon atoms, which can contain substituents that are inert towards water.

Examples of radicals R are alkyl radicals, such as the methyl, ethyl, n-propyl, iso-propyl, 1-n-butyl, 2-n-butyl, isobutyl, tert-butyl, n-pentyl, iso-pentyl, neo-pentyl and tertpentyl radicals; hexyl radicals such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals such as the vinyl, allyl, n-5-hexenyl, 4-vinylcyclohexyl and 3-norbornenyl radicals; cycloalkyl radicals, such as the cyclopentyl, cyclohexyl,4-ethylcyclohexyl, cycloheptyl, norbornyl and methylcyclohexyl radicals; aryl radicals, such as the phenyl, biphenylyl, naphthyl, anthryl and phenanthryl radicals; alkaryl radicals, such as o-, m- and p-tolyl, xylyl and ethylphenyl radicals; and aralkyl radicals such as the benzyl radical and the α- and β-phenylethyl radicals.

Examples of substituted hydrocarbon radicals represented by the radical R are halogenated hydrocarbon radicals such as the chloromethyl, 3-chloropropyl, 3-bromopropyl, 3,3,3-trifluoropropyl and 5,5,5,4,4,3,3-heptafluoropentyl radicals and the chlorophenyl, dichlorophenyl and trifluorotolyl radicals; mercaptoalkyl radicals such as the 2-mercaptoethyl and 3-mercaptopropyl radicals; cyanoalkyl radicals such as the 2-cyanoethyl and 3-cyanopropyl radicals; aminoalkyl radicals such as the 3-aminopropyl, N-(2-aminoethyl)-3-aminopropyl and N-(2-aminoethyl)-3-amino--2-methylpropyl radicals; aminoaryl radicals such as the aminophenyl radical; acyloxyalkyl radicals such as the 3-acryloxypropyl and 3-methacryloxypropyl radicals; hydroxyalkyl radicals such as the hydroxypropyl radical; and radicals of the formulas

and $HOCH_2CH(OH)CH_2SCH_2CH_2{-}$.

The preferred R is the methyl, n-propyl, vinyl, n-5-hexenyl, 3-norbornenyl, phenyl or tolyl radicals.

The examples of the radical $R^1$ are the same examples as indicated for the R radical.

The radical $R^1$ is preferably an alkyl group having from 1 to 6 carbon atoms, which can be substituted by alkoxy groups or hydroxyl groups.

The preferred radical $R^1$ is the methyl, ethyl, n-propyl, isopropyl or hexyl radicals, and more preferably the methyl or ethyl radicals.

The examples of the radical $R^2$ are the same examples as indicated for the R radical.

The preferred radical $R^2$ is the methyl, ethyl, vinyl, n-5hexenyl, 3-norbornenyl or phenyl radicals, and more preferably the methyl, vinyl and n-5-hexenyl radicals.

The examples of the radical $R^3$ are the same examples as indicated for the R radical.

The radical $R^3$ is preferably the methyl, vinyl or phenyl radicals in which the methyl radical is the preferred radical.

If partial hydrolyzates of silanes of formula (I) are used in the process of this invention, they preferably have up to 15 silicon atoms.

Examples of silanes of formula (I) which may be used in the process of this invention are tetramethoxysilane, tetraethoxysilane, tetra-n-propoxysilane, methyltrimethoxysilane, vinyltrimethoxysilane, 3-mercaptopropyltrimethoxysilane, 3-chloropropyltrimethoxysilane, phenyltrimethoxysilane, o, m, p-tolyltrimethoxysilane, propyltrimethoxysilane, methyltriethoxysilane, vinyltriethoxysilane, 3-mercaptopropyltriethoxysilane, 3-chloropropyltriethoxysilane, phenyltriethoxysilane, o, m, p-tolyltriethoxysilane, propyltrimethoxysilane, dimethyldiethoxysilane, dimethyldimethoxysilane and trimethylethoxysilane. The preferred silanes are tetraethoxysilane, methyltrimethoxysilane, methyltriethoxysilane, phenyltriethoxysilane, o, m, p-tolyltriethoxysilane and propyltriethoxysilane.

Examples of organo(poly)siloxanes of formula (II) which may be used in the process of this invention are hexamethyldisiloxane, 1,3-diphenyltetramethyldisiloxane, 1,3-bis(n-5-hexenyl)tetra-methyldisiloxane and 1,3-divinyltetramethylsiloxane. The preferred organo(poly)siloxanes are hexamethyldisiloxane, 1,3-divinyltetramethylsiloxane and 1,3-bis(n-5-hexenyl)tetramethyldisiloxane and more preferably hexamethyldisiloxane is the preferred organo(poly)siloxane of formula (II).

Examples of the organo(poly)siloxanes of formula (III) which may be used in the process of this invention are hexamethylcyclo-trisiloxane, octamethylcyclotetrasiloxane and decamethylcyclopentasiloxane in which octamethylcyclotetrasiloxane and decamethylcyclopentasiloxane are the preferred organo(poly)siloxanes of formula (III).

In one preferred embodiment of the process of this invention, a mixture containing an organo(poly)siloxane of formula (II), especially one in which $R^2$ is the methyl or vinyl radical, and a silane of formula (I), in which a is equal to 0, and/or a partial hydrolyzate thereof, in a molar ratio, preferably from 0.5:1 to 1.0:1.0 and more preferably from 0.6:1 to 0.9:1, is used in the first stage.

In another preferred embodiment of the process of this invention, any desired silane mixtures of formula (I), and/or partial hydrolyzates thereof, with the proviso that at least one silane in which a is equal to 0 or 1, and/or a partial hydrolyzate thereof, is present, are used in the first stage, in which at least 20%, preferably at least 50%, of the total number of radicals R in the mixture being aromatic radicals such as the phenyl or tolyl radicals. The remaining R radicals are preferably the methyl, n-propyl or vinyl radicals. The average value of a, in this preferred embodiment, is between 0.3 and 2.1 and more preferably between 0.5 and 1.5.

The present invention further relates to organopolysiloxane resins made up of $[R^4{}_3SiO_{\frac{1}{2}}]$ and $[SiO_{4/2}]$ units and containing SiC-bonded n-5-hexenyl groups, $R^4$, which can be the same or different, and is the same as R, with the proviso that at least one radical $R^4$ is the n-5-hexenyl radical.

The examples of radical $R^4$ are the same examples as indicated for the radical R.

Examples of organopolysiloxane resins of this invention, containing SiC-bonded n-5-hexenyl groups, are resins of the type $[HexSiMe_2O_{\frac{1}{2}}]_c[Me_3SiO_{\frac{1}{2}}]_d[SiO_{4/2}]_e$ in which Hex is the n-5-hexenyl radical, Me is the methyl radical, the ratio of c:d is 0.05 to 0.2 and the ratio of (c+d):e is 0.5 to 0.9.

The organopolysiloxane resins of this invention, containing SiC-bonded n-5-hexenyl groups, are preferably resins of the type $[HexSiMe_2O_{\frac{1}{2}}]_c[Me_3SiO_{\frac{1}{2}}]_d[SiO_{4/2}]_e$ in which Hex is the n-5-hexenyl radical and Me is the methyl radical, in which those with a ratio of c:d of 0.08 to 0.15 and a ratio of (c+d):e of 0.7 to 0.9 are particularly preferred.

The organopolysiloxane resins of this invention, containing SiC-bonded n-5-hexenyl groups, can be prepared by the process of this invention using at least one organo(poly)siloxane of formula (II), with at least one radical $R^2$ being the n-5-hexenyl radical, especially 1,3-bis(n-5-hexenyl)tetramethyldisiloxane, and a silane of formula (I) in which a is equal to 0, and/or a partial hydrolyzate thereof, in a molar ratio preferably of from 0.50:1 to 0.80:1 and more preferably from 0.65:1 to 0.75:1.

In the first stage of the process of this invention, water and acid and, if appropriate, other substances are added to a silane of formula (I), and/or a partial hydrolyzate thereof, and if appropriate mixed with an organo(poly)siloxane of formula (II) and/or (III), and then mixed.

In the first stage of the process of this invention, water is used in amounts preferably from 10 to 30% by weight, and more preferably from 10 to 20% by weight and especially from 14 to 17% by weight, based on the total weight of the reaction mixture of the first stage.

The acids used in the first stage of the process of this invention can be the same acids as those used heretofore or those which could have been used heretofore for the hydrolysis of silanes containing organyloxy groups. Examples of such acids are inorganic acids such as HCl, $HClO_4$, $H_2SO_4$ and $H_3PO_4$, organic acids such as formic acid, acetic acid, propionic acid, p-toluenesulfonic acid, methanesulfonic acid, trifluoromethanesulfonic acid and dodecylbenzene sulfonic acid, and acidic ion exchange resins. Preferably HCl, dodecylbenzenesulfonic acid and p-toluenesulfonic acid are used.

In the first stage of the process of this invention, acid is used in amounts preferably of at least 10 ppm (parts per million) and more preferably of at least 100 ppm, based on the total weight of the reaction mixture in the first stage. The upper limit of the acid concentration depends on the one hand on the type of acid and on the other hand on the desired degree of homogeneity of the reaction mixture. When using HCl as the acid, for example, a concentration range of 100 to 3000 ppm, based on the total weight of the reaction mixture in the first stage, has proved advantageous. Homogeneity of the reaction mixture is not generally achieved at higher acid concentrations.

The pH of the reaction mixture in the first stage of the process of this invention is preferably in the range of from 0 to 3 and more preferably in the range of from 1 to 2.

Preferably up to 0.01% by weight, based on the total weight of the reaction mixture in the first stage, of other substances can additionally be used in the first stage of the process of this invention. Examples of other substances are polymerization inhibitors which are intended to prevent the homopolymerization of olefinic starting materials such as 1,3-bis(n-5-hexenyl)tetramethyldisiloxane.

Examples of polymerization inhibitors which may be used are hydroquinone, pyrocatechol and BHT (2,6-di-t-butyl-4-methylphenol).

The compound $R^1OH$ formed in the hydrolysis of the first stage of the process of this invention, in which $R^1$ is the same as above, can be wholly or partially removed during or after the hydrolysis.

The compound $R^1OH$, especially where $R^1$ is an alkyl radical having from 1 to 6 carbon atoms, is advantageously removed by distillation during the hydrolysis. It is especially preferred that the removal by distillation be started about 30 minutes to 1 hour after the beginning of the hydrolysis, so that the distillation of the silanes used is substantially avoided.

The compound $R^1OH$, where $R^1$ is the same as above, is preferably distilled off to the extent that the reaction mixture remains homogeneous. Preferably up to 95% by weight of compound $R^1OH$, based on the total weight of compound $R^1OH$ formed, where $R^1$ is the same as above, is removed by distillation.

The first stage of the process of this invention is preferably carried out at a temperature of from 20° C. up to the boiling point of the reaction mixture, and more preferably at the boiling point of the reaction mixture, and at a pressure preferably of between 900 and 1100 hPa.

The first stage of the process of this invention is preferably terminated after 20 minutes to 5 hours and more preferably after 2 to 3 hours.

When the first stage of the process of this invention has terminated, base is added in at least the amount necessary to neutralize the reaction mixture. Other substances also may be added if appropriate. The amounts of base added are generally in the range of from 0.1 to 2.0% by weight, based on the total weight of the reaction mixture in the second stage.

The amount of base added in the second stage is preferably such that the pH is in the range of from 8.0 to 14.0 and more preferably from 9.0 to 12.0.

Bases which can be used in the second stage of the process of this invention are all those which have been or could have been used heretofore as catalysts in condensation reactions.

Examples of such bases are alkali metal hydroxides such as sodium hydroxide and potassium hydroxide, alkali metal siliconates such as sodium siliconate and potassium siliconate, amines such as, for example, methylamine, dimethylamine, ethylamine, diethylamine, triethylamine and n-butylamine, ammonium compounds such as, for example, tetramethylammonium hydroxide, tetra-n-butylammonium hydroxide and benzyltrimethylammonium hydroxide, and basic ion exchangers, in which sodium hydroxide, methylamine, ethylamine, diethylamine and benzyltrimethylammonium hydroxide are preferred and more preferably the more volatile bases such as methylamine, ethylamine and diethylamine.

If desired, the base can be added in a mixture with water and/or a polar, water-soluble organic solvent. However, the dilution of the base must not be so high that the addition of the base results in precipitation of the organopolysiloxane resin formed.

If desired, a polar, water-soluble organic solvent can be used in the second stage of the process of this invention. Depending on the amount used and the type of solvent, this can contribute to achieving a homogeneous reaction mixture.

The expression polar, water-soluble organic solvents is to be understood hereafter as meaning solvents which are preferably completely miscible with water at room temperature and at the pressure of the surrounding atmosphere. However, the minimum solubility of the organic solvent must be above 300 g/l of water at room temperature and at the pressure of the surrounding atmosphere.

Examples of polar, water-soluble organic solvents are methanol, ethanol, acetone, dioxane, dimethylformamide, tetrahydrofuran, dimethyl sulfoxide and mixtures thereof, in which tetrahydrofuran and dioxane are preferred and tetrahydrofuran is more preferred.

If a polar, water-soluble organic solvent is used, it is preferably used in amounts which result in achieving a substantially homogeneous reaction mixture. These amounts are preferably up to about 30% by weight, and more preferably up to about 20% by weight, of polar, water-soluble organic solvent, based on the total weight of the reaction mixture in the second stage.

Examples of the other substances which may be added in the second stage are silanes of formula (I) in which all or some of the radicals R are acid-sensitive organic radicals such as, for example, 3-aminopropyl, N-(2-aminoethyl)-3-aminopropyl and aminophenyl radicals.

The second stage of the process of this invention is preferably carried out at a temperature of between 50° C. and the boiling point of the reaction mixture, and more preferably at the boiling point of the reaction mixture, and at a pressure preferably of between 900 and 1100 hPa.

The second stage of the process of this invention is terminated preferably after 1 to 5 hours and more preferably after 2 to 4 hours.

When the second stage has terminated, the reaction mixture is stirred into water, and if appropriate mixed with additives. The organopolysiloxane resin precipitates out as hydrophobic particles.

The amount of water used in the third stage of the process of this invention is preferably 500 to 1000% by weight and more preferably 600 to 700% by weight, based on the total weight of the reaction mixture in the second stage.

To obtain organopolysiloxane resins which are free from base, the reaction mixture obtained in the second stage can be neutralized with acid after the termination of the second stage and before precipitation in water, or the precipitation can be carried out in water containing acid. Suitable acids which may be employed are all those mentioned in the first stage. If neutralization is to be carried out, which is the case especially in the preparation of organopolysiloxane resins containing phenyl groups, the reaction mixture obtained in the second stage of the process of this invention is preferably neutralized before the precipitation.

In addition to the acid, other additives, for example flocculation aids, can also be added to the water used in the third stage of the process of this invention.

Examples of flocculation aids are polyvinyl acetate, polyvinyl alcohol, polyacrylate and polyamine.

If flocculation aids are used in the third stage of the process of this invention, they are preferably used in amounts of from 0.01 to 0.05% by weight, based on the amount of water used in the third stage.

Preferably, however, neutral water without additives is used in the third stage of the process of this invention, so that residues in the organopolysiloxane resin prepared according to this invention can be substantially avoided.

The third stage of the process of this invention is carried out at temperatures preferably of from 0° to 50° C., and more preferably from 10° to 25° C., and at a pressure of from 900 to 1100 hPa. However, it is also possible to apply higher or lower pressures. If the precipitation is carried out at reduced pressure or under vacuum, readily volatile constituents can be at least partially removed during the precipitation.

The third stage of the process of this invention can be carried out batchwise in a stirring apparatus. However, the precipitation can also be carried out continuously in a simple manner which reduces waste. This is accomplished, for example, by metering the reaction mixture of the second stage and the precipitation water into a loop and separating off the precipitated resin with the aid of a filtration device. If the water contains a polar, water-soluble organic solvent, it is freed from the latter and reused for the precipitation. The organic solvent can be reused in the second stage of the process of this invention.

In a preferred embodiment of the process of this invention, in the first stage a silane of formula (I) in which a is equal to 0, especially tetraethoxysilane, and/or a partial hydrolyzate thereof, and an organo(poly)-siloxane of formula (II) are mixed with water and acid and reacted at the boiling point of the reaction mixture, i.e., 78° C. in the case of tetraethoxysilane and/or a partial hydrolyzate thereof, and at a pressure of between 900 and 1100 hPa. In the second stage the reaction mixture obtained in the first stage is reacted in the presence of base and a polar, water-soluble organic solvent, especially tetrahydrofuran, at the boiling point of the reaction mixture, i.e., 65° C. in the case of tetrahydrofuran, and at a pressure of between 900 and 1100 hPa, and in the third stage the reaction mixture obtained in the second stage is stirred into water at room temperature and at a pressure of between 900 and 1100 hPa.

The process of this invention can be carried out batchwise, semicontinuously or continuously. A continuous preparation of organopolysiloxane resin is possible for example if the reaction mixture obtained in the first stage and base are metered in, and the compound $R^1OH$ which is formed, where $R^1$ is the same as above, is distilled off continuously, and then the reaction mixture is stirred into water when the reaction has terminated.

The process of this invention has the advantage that it is very easy to carry out, produces high space-time yields and does not require water-insoluble solvents to separate off the organo-polysiloxane resin. In the process of this invention, resins of high purity are obtained as fine powders with high solution kinetics. The process of this invention has the further advantage that the thermal stress on the resin is very low.

The organopolysiloxane resin of this invention has an average molecular weight preferably of from 3000 to 10,000 and, based on silicon, contains an average of less than 3 mol percent of radicals —$OR^1$, where $R^1$ is the same as above. The organopolysiloxane resin of this invention is at least partially soluble but preferably totally soluble in liquid organopolysiloxanes.

Examples of organopolysiloxane resins of this invention are $[Me_3SiO_{\frac{1}{2}}]_x[SiO_{4/2}]_y$, where Me is the methyl radical and the ratio x:y is 0.6:1 to 0.9:1, and $[Me_3SiO_{\frac{1}{2}}]_x [Me_2 ViSiO_{\frac{1}{2}}]_y [SiO_{4/2}]_z$, where Me is the methyl radical, Vi is the vinyl radical, the ratio (x+y):z is 0.6:1 to 0.9:1 and the ratio x:y is 98:2 to 80:20.

The present invention further relates to a process for the preparation of an organopolysiloxane resin powder, wherein in a first stage at least one silane of the formula $$R_aSi(OR^1)_{4-a} \qquad (I)$$

in which a, R and $R^1$ are the same as above, and/or a partial hydrolyzate thereof, with the proviso that at least one silane of formula (I) in which a is equal to 0 or 1, and/or a partial hydrolyzate thereof, is used, and, if appropriate, an organo(poly)siloxane selected from the group consisting of $$R^2{}_3Si-O-SiR^2{}_3 \qquad (II)$$

in which $R^2$ is as defined above, and $$(R^3{}_2SiO)_b \qquad (III)$$

in which $R^3$ and b are the same as above, and mixtures thereof, are reacted in water in the presence of acid and, if appropriate, other substances, in a second stage the reaction mixture obtained in the first stage is reacted in the presence of base and, if appropriate, other substances, in a third stage the reaction mixture obtained in the second stage is stirred into water, if appropriate mixed with additives, and in a fourth stage the precipitated organopolysiloxane resin obtained in the third stage is filtered off, washed with water if necessary and dried.

The organopolysiloxane resin of this invention can be dried in conventional dryers, for example, a fluid-bed dryer, at temperatures preferably of up to 200° C., and more preferably up to 160° C., and at a pressure of between 900 and 1100 hPa. However, the drying can also be carried out at higher or lower pressures. Thermolabile organopolysiloxane resins are preferably dried at reduced pressure, especially under vacuum and at correspondingly lower temperatures.

The particle size of the organopolysiloxane resin powder of this invention depends on several factors, for example on the rate at which the reaction mixture of the second stage is metered into the precipitation water, on the stirring and flow conditions in the precipitation of the third process stage and the duration of the movement in the precipitation bath, on additives which may be used and on the drying of the fourth stage of the process of this invention.

The process of this invention for preparing the organopoly-siloxane powder has the advantage that it is technically very easy to carry out and reproducible and that it is possible to dispense with the application of expensive grinding processes. Because of the mild reaction conditions, the process of this invention makes it possible to prepare thermolabile organopolysiloxane resin powders.

The resulting organopolysiloxane resin powders of this invention have an average particle size preferably of from 1 to 200 μm. The organopolysiloxane resin powders of this invention are at least partially soluble but preferably totally soluble in liquid organopolysiloxanes and common organic solvents. The organopolysiloxane resin powders of this invention have excellent solubility in organic solvents such as toluene, acetone, hexane and tetra-hydrofuran, whereas they are only partially soluble in lower alcohols such as methanol and ethanol.

The organopolysiloxane resin powders of this invention have the advantage that they are obtained free from organic solvent, possess good solution kinetics and additionally have good storage stability, The organopolysiloxane resins of this invention are suitable for all applications for which organopolysiloxane resins could also be used heretofore. Thus the organopolysiloxane resin powders of this invention can be used for example as additives for antifoams, toners, painting systems and other coating systems such as, for example, paper coating compositions. However, they can also be used as fillers in plastics, especially silicone rubber, in place of highly disperse silicic acid which has been rendered hydrophobic. In particular, the organopolysiloxane resin powders of this invention, containing SiC-bonded aromatic radicals, such as organopolysiloxane resin powders containing phenyl and/or tolyl groups, are especially suitable for the preparation of weather-resistant paints.

The organopolysiloxane resin powders of this invention, containing at least one SiC-bonded n-5-hexenyl group, can be used in coating systems which cure at low temperatures, or the so-called LTC (Low Temperature Curing) systems, especially for rapid cross-linking systems in paper coating.

Unless indicated otherwise, all parts and percentages in the following Examples are by weight. Unless indicated otherwise, the following Examples are carried out at the pressure of the surrounding atmosphere, i.e., at about 1000 hPa, and at room temperature, i.e., at about 20° C., or at the temperature which is obtained when the reactants are brought together at room temperature without additional heating or cooling. All the viscosity data given in the Examples are at a temperature of 25° C.

EXAMPLE 1

About 200 g of water and 4 g of 10% HCl in water are added to 900 g of tetraethoxysilane containing 40% of $SiO_2$ (commercially available under the name TES 40 from Wacker-Chemie GmbH, Munich) and 400 g of hexamethyldisiloxane. The resultant mixture is refluxed for a period of 2 hours at a temperature of 78° C. and then 470 g of ethanol are distilled off over a period of one hour. About 300 ml of tetrahydrofuran and 2.5 g of a 40% solution of methylamine in water (commercially available from Merck, Darmstadt) are then added to the homogeneous mixture and then refluxed for a period of 3 hours at 65° C. The resulting homogeneous reaction mixture is then added to 5 l of water, with vigorous stirring, and the precipitate thus formed is filtered off and dried at 120° C. to give 720 g of a white infusible organopolysiloxane resin powder with a residual ethoxy content of 2.3%, an average particle diameter of 20.0 μm, a residual hydroxyl content of 0.9% and a bulk density of 0.35 kg/l. The resultant organo-polysiloxane resin powder is soluble up to 60% in common organic solvents such as toluene, acetone, hexane and tetrahydrofuran, and in liquid organopolysiloxanes such as, for example, α,w-trimethylsilylpolydimethylsiloxane having a viscosity of 350 cSt.

The viscosity of a 50% solution of the resulting organopolysiloxane resin powder in toluene is 5 cSt.

EXAMPLE 2

The procedure of Example 1 is repeated, except that 385 g of hexamethyldisiloxane and 60 g of 1,3-divinyltetramethyldisiloxane are used instead of the 400 g of hexamethyldisiloxane. The reaction mixture is homogeneous in the acid stage as well as in the basic stage. About 740 g of a white infusible organopolysiloxane resin powder having a residual ethoxy content of 2.5%, an average particle diameter of 20.0 μm, a residual hydroxyl content of 0.7% and a bulk density of 0.35 kg/l are obtained. The resulting organopolysiloxane resin powder is soluble up to 60% in common organic solvents such as toluene, acetone, hexane and tetrahydrofuran, and in liquid organopolysiloxanes such as, for example, α,w-trimethylsilylpolydimethylsiloxane having a viscosity of 350 cSt.

The viscosity of a 50% solution of the resulting organopolysiloxane resin powder in toluene is 3.2 cSt.

EXAMPLE 3

About 200 g of water and 8 g of 10% HCl in water are added to 900 g of tetraethoxysilane containing 40% of $SiO_2$ (commercially available under the name TES 40 from Wacker-Chemie GmbH, Munich), 400 g of hexamethyldisiloxane and 50 g of 1,3-bis(n-5-hexenyl)tetramethyldisiloxane. The resultant mixture is treated in accordance with the procedure described in Example 1. The reaction mixture is homogeneous in the acid stage as well as in the basic stage. About 735 g of a white infusible organopolysiloxane resin powder having a residual ethoxy content of 2.5% and an average particle diameter of 18.0 μm are obtained. The resulting organopolysiloxane resin powder is soluble up to 60% in common organic solvents such as toluene, acetone, hexane and tetrahydrofuran, and in liquid organopolysiloxanes such as, for example, α,w-tri-methylsilylpolydimethylsiloxane having a viscosity of 350 cSt.

The viscosity of an 80% solution of the resulting organopolysiloxane resin powder in cyclohexane is 84 cSt.

EXAMPLE 4

About 200 g of water and 3 g of dodecylbenzenesulfonic acid are added to 900 g of tetraethoxysilane containing 40% of $SiO_2$ (commercially available under the name TES 40 from Wacker-Chemie GmbH, Munich), 385 g of hexamethyldisiloxane and 20 g of 1,3-bis(3-norbornenyl)tetramethyldisiloxane with an endo:exo ratio of 1:1. The resultant mixture is treated in accordance with the procedure described in Example 1. The reaction mixture is homogeneous in the acid stage as well as in the basic stage. About 670 g of a white infusible organopolysiloxane resin powder having a residual ethoxy content of 2.5% and an average particle diameter of 20.0 μm are obtained. The resulting organopolysiloxanes resin powder is soluble up to 60% in common organic solvents such as toluene, acetone, hexane and tetrahydrofuran, and in liquid organopolysiloxanes such as, for example, α,w-trimethylsilylpolydimethylsiloxane having a viscosity of 350 cSt.

The viscosity of a 50% solution of the resulting organopolysiloxane resin powder in toluene is 3.5 cSt.

COMPARISON 1

The procedure described in Examples 1 to 4 is repeated, except that in each case, after the distillation of the ethanol formed in the acid hydrolysis, the reaction mixture is stirred into 5 l of water without the addition of methylamine and tetrahydrofuran. A viscous sticky mass precipitates out which is separated off and dried at room temperature to give an organopolysiloxane resin which is insoluble in all common organic solvents and in liquid organopolysiloxanes.

EXAMPLE 5

About 160 ml of water and 3.6 ml of 10% HCl in water are added to 240 ml of phenyltriethoxysilane and 116 ml of n-propyltriethoxysilane and the resultant mixture is refluxed for a period of 2 hours at a temperature of 78° C. About 240 ml of ethanol are then distilled off over a period of one hour. About 150 ml of tetrahydrofuran and 8.0 g of diethylamine (commercially available from Merck, Darmstadt) are added and the mixture is refluxed for a period of 4 hours at 65° C. After neutralization with acetic acid, the reaction mixture is added to 3 l of water, with vigorous stirring, and the precipitate thus formed is filtered off and dried at 80° C. and 15 hPa. The reaction mixture is homogeneous in the acid stage as well as in the basic stage. About 160 g of a white organopolysiloxane resin powder having a residual ethoxy content of 1.3%, an average particle diameter of 17.0 μm and a melting range of 90° to 120° C. are obtained. The resulting organopolysiloxane resin powder is soluble up to 60% in common organic solvents such as toluene, acetone, hexane and tetrahydrofuran. The viscosity of a 50% solution of the resulting organopolysiloxane resin powder in toluene is 22 cSt.

COMPARISON EXAMPLE 2

The procedure described in Example 5 is repeated, except that, after the distillation of the ethanol formed in the acid hydrolysis, the reaction mixture is stirred into 3 l of water without the addition of diethylamine and tetrahydrofuran. A viscous sticky mass precipitates out which after separation and drying at room temperature, solidifies to an organopolysiloxane resin which is insoluble in all common organic solvents.

EXAMPLE 6

About 85 ml of water and 2.0 g of 10% HCl in water are added to 400 g of phenyltrimethoxysilane, 40 g of tolyltrimethoxysilane, 30 g of dimethyldimethoxysilane and 30 g of hexamethyldisiloxane, and then the mixture is refluxed for a period of 3 hours at a temperature of 65° C. About 450 g of methanol are then distilled off over a period of one hour. About 100 g of tetrahydrofuran and 10.0 g of a 70% solution of ethylamine in water (commercially available from Merck, Darmstadt) are added and then refluxed for a period of 4 hours at 65° C. The resulting reaction mixture is then added, with vigorous stirring, to 3 l of water containing 0.1% of a flocculation aid based on polyvinyl acetate (commercially available under the name PVA 40/140 from Wacker-Chemie GmbH, Munich) and the precipitate thus formed is filtered off and dried at 80° C. and 15 hPa. The reaction mixture is homogeneous in the acid stage as well as in the basic stage. About 200 g of a white organopolysiloxane resin powder having a residual methoxy content of 1.8%, an average particle diameter of 20.0 μm and a melting range of 100° to 120° C. are obtained. The resulting organopolysiloxane resin powder is soluble up to 60% in common organic solvents such as toluene, acetone, hexane and tetrahydrofuran.

EXAMPLE 7

About 86 g of a solution containing 10 mmol of dodecylbenzenesulfonic acid in 1 l of water are added to 428 g of phenyltriethoxysilane and then the mixture is refluxed for a period of 3 hours at a temperature of 78° C. About 100 g of ethanol are removed as distillate. About 0.6 g of diethylamine (commercially available from Merck, Darmstadt) is then added an the mixture is refluxed for a period of 1 hour at 78° C. and then cautiously neutralized with acetic acid. The resulting reaction mixture is added to 3 l of water, with vigorous stirring, and the precipitate thus formed is filtered off and dried at 80° C. and 15 hPa. The reaction mixture is homogeneous in the acid stage as well as in the basic stage. About 205 g of a white organopolysiloxane resin powder having a residual ethoxy content of 2.0% are obtained. The resulting organopolysiloxane resin powder is soluble up to 60% in common organic solvents such as toluene, acetone, hexane and tetrahydrofuran.

EXAMPLE 8

About 200 g of water and 4 g of 10% HCl in water are added to 800 g of tetraethoxysilane containing 40% $SiO_2$ (commercially available under the name TES 40 from Wacker-Chemie GmbH, Munich), 50 g of methyltriethoxysilane, 50 g of phenyltriethoxysilane and 360 g of hexamethyldisiloxane. The resultant mixture is refluxed for a period of 2 hours at a temperature of 78° C. an then 450 g of ethanol are distilled off over a period of one hour. About 200 g of dioxane and 4.0 g of a 40% solution of methylamine in water (commercially available from Merck, Darmstadt) are then added and the mixture is refluxed for a period of 3 hours at 90° C. The resulting reaction mixture is then added to 5 l of water, with vigorous stirring and under a pressure of 500 hPa, and the precipitate thus formed is filtered off and dried at 80° C. and 15 hPa. The reaction mixture is homogeneous in the acid stage as well as in the basic stage. About 700 g of a white infusible organopolysiloxane resin powder having a residual ethoxy content of 2.3% and an average particle diameter of 20.0 μm are obtained. The resulting organopolysiloxane resin powder is soluble up to 40% in common organic solvents such as toluene, acetone, hexane and tetrahydrofuran.

EXAMPLE 9

About 450 g of tetraethoxysilane containing 40% $SiO_2$ (commercially available under the name TES 40 from Wacker-Chemie GmbH, Munich), 166 g of hexamethyldisiloxane, 28 mg of BHT (commercially available from Fluka, Neu-Ulm) and 42 g of 1,3-bis(n-5-hexenyl)tetramethyldisiloxane are added to 100 g of water and 3.8 g of 10% HCl in water and the resultant mixture is refluxed for a period of 3 hours. A clear solution is formed after 30 minutes. About 300 ml of distillate are then removed over a period of one hour. A solution containing 3.4 g of 40% aqueous methylamine (commercially available from Merck, Darmstadt) in 150 ml of tetrahydrofuran is then added and the resultant clear solution is refluxed for a period of 3 hours. The resultant reaction mixture is then stirred into 2.5 l of water. After stirring for 30 minutes, the resin which has precipitated out is filtered off, washed with water and dried to constant weight at 160° C. to give 365 g of a white infusible organopolysiloxane resin powder having a residual ethoxy content of 2.5%. The resulting organopolysiloxane resin powder is soluble up to 60% in common organic solvents such as toluene, acetone, hexane and tetrahydrofuran, and in liquid organopolysiloxanes such as, for example, α,w-trimethylsilylpolydimethylsiloxane having a viscosity of 350 cSt.

The viscosity of a 50% solution of the resulting organopolysiloxane resin powder in toluene is 9 cSt.

COMPARISON EXAMPLE 3

About 500 g of water and 50 g of aqueous ammonia (28%) are cooled to 10° C. A mixture containing 147 g of methyltri-methoxysilane and 54 g of phenyltrimethoxysilane is added dropwise over 40 minutes, the temperature rising to 33° C. The mixture is then refluxed for one hour and cooled to room temperature and the powder which has precipitated out is filtered off, washed with water and dried to constant weight at 120° C. A white powder which is insoluble in all common organic solvents is formed in 95% yield.

What is claimed is:

1. A process for preparing an organopolysiloxane resin, which consists essentially of reacting in a first stage at least one silane of the formula $$R_a Si(OR^1)_{4-a} \quad (I)$$

in which a is 0, 1, 2 or 3, R is a monovalent organic radical, $R^1$ is a monovalent organic radical, and/or a partial hydrolyzate thereof, with the proviso that at least one silane of formula (I) in which a is equal to 0 or 1, and/or a partial hydrolyzate thereof, is present, and, optionally, an organo(poly)siloxane selected from the group consisting of $$R^2{}_3Si-O-SiR^2{}_3 \quad (II)$$

in which $R^2$ is the same as R, $$(R^3{}_2SiO)_b \quad (III)$$

in which $R^3$ is the same as R, and b is an integer with a value of from 3 to 8, and mixtures thereof, with water in the presence of acid and optionally a polymerization inhibitor, in a second stage reacting the reaction mixture obtained in the first stage with a base and in a third stage adding with agitation the reaction mixture obtained in the second stage into water and precipitate the organopolysiloxane resin.

2. The process of claim 1, wherein a mixture containing an organo(poly)siloxane of formula (II) and a silane of formula (I) in which a is equal to 0, and/or a partial hydrolyzate thereof, is present in the first stage.

3. The process of claim 1, wherein a mixture of silanes of formula (I), and/or partial hydrolyzates thereof, with the proviso that at least one silane in which a is equal to 0 or 1, and/or a partial hydrolyzate thereof, is present in the first stage, in which at least 20% of the total number of radicals R in said mixture are aromatic radicals.

4. The process of claim 1, wherein the acid present in the first stage is selected from the group consisting of HCl, p-toluenesulfonic acid and dodecylbenzenesulfonic acid.

5. The process of claim 1, wherein the second stage is carried out at a pH of between 8.0 and 14.0.

6. The process of claim 1, wherein water is present in the third stage in an amount of from 500 to 1000% by weight, based on the total weight of the reaction mixture of the second stage.

7. The process of claim 1, wherein in a first stage a silane of formula (I) in which a is equal to 0, and/or a partial hydrolyzate thereof, and an organo(poly) siloxane of formula (II) are mixed with water and acid and reacted at the boiling point of the reaction mixture and at a pressure of between 900 and 1100 hPa, in a second stage the reaction mixture obtained in the first stage is reacted in the presence of base and a polar, water-soluble organic solvent at the boiling point of the reaction mixture and at a pressure of between 900 and 1100 hPa, and in a third stage the reaction mixture obtained in the second stage is stirred into water at room temperature and at a pressure of between 900 and 1100 hPa.

8. An organopolysiloxane resin containing [$R^4{}_3SiO_{\frac{1}{2}}$] and [$SiO_{4/2}$] units, in which $R^4$ is a monovalent organic radical with the proviso that at least one radical $R^4$ is a SiC-bonded n-5-hexenyl radical.

9. A process for preparing an organopolysiloxane resin powder which comprises reacting in a first stage at least one silane of the formula $$R_aSi(OR^1)_{4-a} \quad (I)$$

in which a is 0, 1, 2 or 3, R a monovalent organic radical, $R^1$ is a monovalent organic radical, and/or a partial hydrolyzate thereof, with the proviso that at least one silane of formula (I) in which a is equal to 0 or 1, and/or a partial hydrolyzate thereof, is present, and, optionally, an organo(poly)siloxane selected from the group consisting of $$R^2{}_3Si-O-SiR^2{}_3 \quad (II)$$

in which $R^2$ is the same as R, $$(R^3{}_2SiO)_b \quad (III)$$

in which $R^3$ is the same as R, and b is an integer with a value of from 3 to 8, and mixtures thereof, with water in the presence of an acid and optionally a polymerization inhibitor, in a second stage reacting the reaction mixture obtained in the first stage with a base and in a third stage adding with agitation the reaction mixture obtained in the second stage into water, and in a fourth stage filtering off the precipitated organopolysiloxane resin obtained in the third stage and thereafter washing with water if necessary and drying.

10. The process of claim 1, wherein the reaction mixture obtained in the second stage is neutralized before the reaction mixture is added to water.

11. The process of claim 1, wherein the reaction mixture obtained in the second stage is added with agitation to water containing sufficient acid to neutralize the reaction mixture.

12. The process as claimed in claim 1, wherein a polar water-soluble organic solvent is added in the second stage.

13. The process as claimed in claim 1, wherein a silane of formula (I) in which some of the radicals R are acid-sensitive organic radicals are added in the second stage.

14. The process as claimed in claim 1, wherein acid is added in the third stage in an amount sufficient to neutralize the base.

15. The process as claimed in claim 1, wherein a flocculation aid is added in the third stage.

16. The process as claimed in claim 12, wherein a silane of formula (I) in which some of the radicals R are acid-sensitive organic radicals are added in the second stage.

17. The process as claimed in claim 14, wherein a flocculation aid is added in the third stage.

* * * * *